United States Patent [19]

Byer et al.

[11] Patent Number: 4,833,682
[45] Date of Patent: May 23, 1989

[54] MOVING SLAB LASER

[75] Inventors: Robert L. Byer, Stanford; Santanu Basu, Palo Alto, both of Calif.

[73] Assignee: Board of Trustees, Leland Stanford, University, Stanford, Calif.

[21] Appl. No.: 101,138

[22] Filed: Sep. 24, 1987

[51] Int. Cl.[4] ............................................. H01S 3/04
[52] U.S. Cl. ...................................... 372/34; 372/33; 372/35; 372/72
[58] Field of Search ....................... 372/34, 70, 35, 66, 372/71, 33, 72

[56] References Cited

U.S. PATENT DOCUMENTS 4,555,786 11/1985 Byer et al. ............................ 372/70

OTHER PUBLICATIONS

Basu et al; "A Proposed 1kw Average Power Moving Slab Nd:Glass Laser"; IEEE JQE, QE-22(10), Oct. '86.

Primary Examiner—Léon Scott, Jr.
Attorney, Agent, or Firm—Harry E. Aine

[57] ABSTRACT

A moving slab laser includes a slab carriage driven to-and-fro along a precise rectilinear reciprocal path by a liner motor under the control of a computer. The reciprocal motion of the slab is precisely guided by cross roller ways or ball bushing bearings to minimize non-rectilinear motion-dependent output beam steering effects. In one embodiment, the lasant slab is separated into a pair of axially spaced geometrically identical portions which are reciprocated in opposite directions to cancel motion direction dependent beam steering effects.

6 Claims, 1 Drawing Sheet

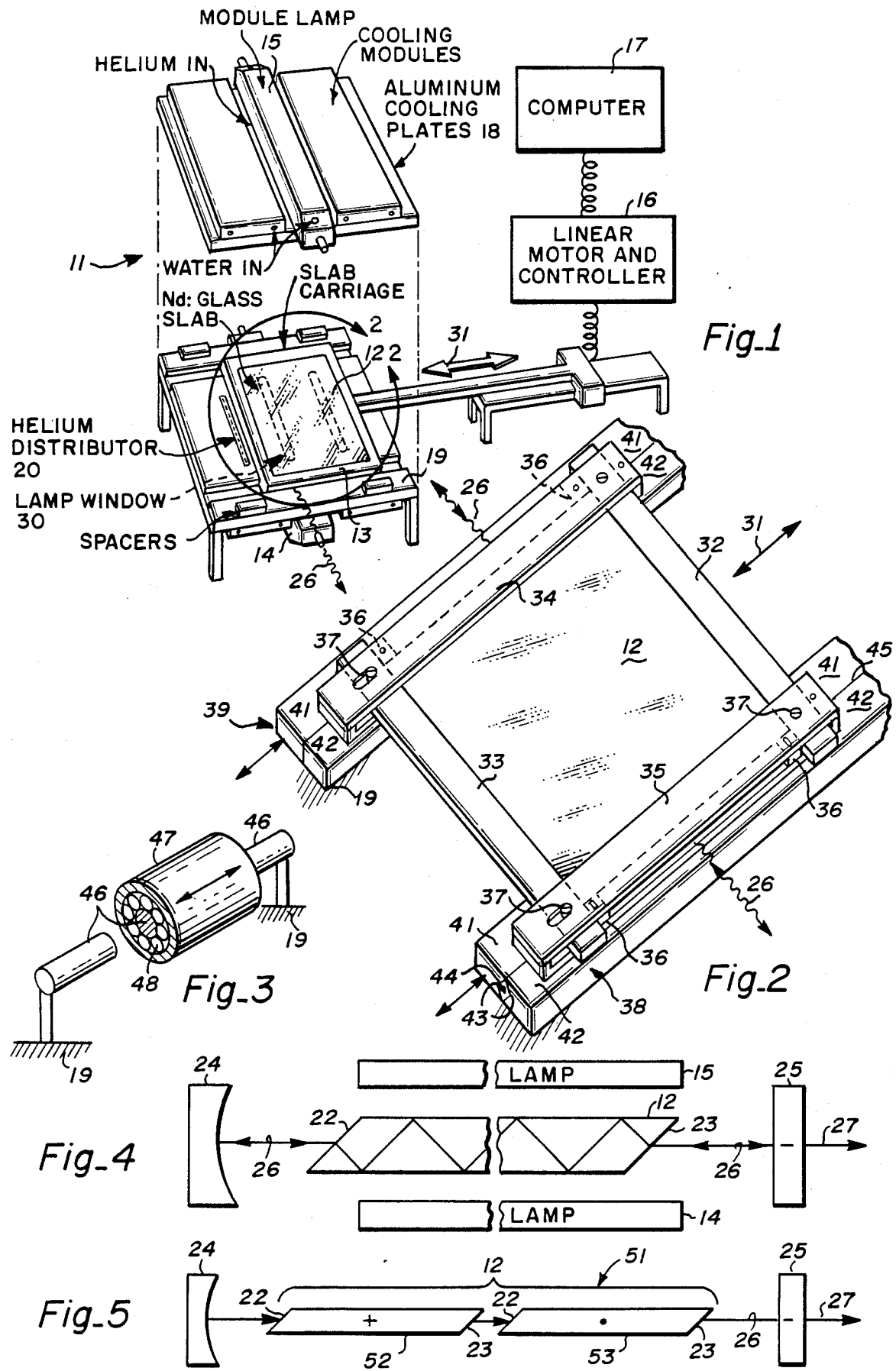

MOVING SLAB LASER

GOVERNMENT CONTRACT

The present invention was made during performance of U.S. Office Of Naval Research Contract #N00014-83-K-0449 and the Government has certain rights therein.

BACKGROUND OF THE INVENTION

The present invention relates in general to moving slab lasers and, more particularly, to such lasers in which the slab is moved to-and-fro over a precise rectilinear reciprocal path to inhibit beam steering effects.

DESCRIPTION OF THE PRIOR ART

Heretofore, it has been proposed to move a slab of lasant material, such as Nd:Glass to-and-fro along a rectilinear reciprocal path relative to optical pumping lamps which illuminate the slab through selected narrow regions of the major faces of the slab. In this manner, the heat generated in the slab by the optical pumping radiation is evenly distributed througout the slab to reduce unwanted thermally induced depolarization and focusing effects on the output beam.

It is also known to cool the slab of lasant material by thermal conduction through a static layer of helium to an adjacent watercooled slab of aluminum. Such a prior art laser is disclosed in U.S. Pat. No. 4,555,786, issued Nov. 26, 1985, the disclosure of which is hereby incorporated by reference in its entirety.

One of the problems encountered in such a prior art reciprocating slab laser, especially when the geometrical configuration of the optical resonator is such that the optical axis of the resonator is generally parallel to the major faces of the slab, is that there results a beam steering effect which is dependent on non-rectilinear motion of the slab. In addition, there results a motion direction beam steering effect produced by a thermal gradient associated with optical pumping of the moving slab.

It is desired to produce a moving slab laser in which motion dependent, beam steering effects are minimized.

SUMMARY OF THE PRESENT INVENTION

The principal object of the present invention is the provision of an improved moving slab laser in which motion-dependent, beam steering effects are minimized.

In one feature of the present invention, the slab of lasant material is held in a carriage and its to-and-fro movement precisely guided over a reciprocal rectilinear path so as to minimize non-rectilinear motion-dependent, beam steering effects.

In another feature of the present invention, the reciprocal movement of the carriage and slab of lasant material is precisely guided by cross roller way assemblies.

In another feature of the present invention, the reciprocal movement of the carriage and slab of instant material is precisely guided by ball bushing bearing assemblies.

In another feature of the present invention, the slab of lasant material is moved to-and-fro by a linear motor.

In another feature of the present invention, the slab of lasant material includes a pair of slab portions moved to-and-fro in opposite parallel directions to cancel motion-dependent beam steering effects.

Other features and advantages of the present invention will become apparent upon a perusal of the following specification taken in conjunction with the accompanying drawings wherein:

BRIEF DESCRIPTION OF THE DRAWINGS

FIG. 1 is a schematic perspective exploded view, partly in block diagram form, depicting a moving slab laser system incorporating features of the present invention;

FIG. 2 is an enlarged perspective view of a slab carriage portion of the structure of FIG. 1 delineated by line 2—2;

FIG. 3 is a perspective view of an alternative slab carriage-guiding mechanism of the present invention;

FIG. 4 is a schematic longitudinal sectional view of a moving slab laser of the present invention, and FIG. 5 is a schematic view similar to that of FIG. 4 depicting an alternative embodiment of the present invention.

DESCRIPTION OF THE PREFERRED EMBODIMENTS OF THE PRESENT INVENTION

Referring now to FIG. 1, there is shown a moving slab laser system 11 incorporating features of the present invention. A slab 12 of lasant material, such as LHG-5 Nd:Glass or LHG-8 Nd:Glass, commercially available from Hoya Optics, Inc. is held in a slab carriage 13 and moved to-and-fro along a rectilinear path relative to optical pumping lamp assemblies 14 and 15 disposed on opposite sides of the major faces of the slab 12 of lasant material. Reciprocal motion of the slab 12 is controlled by a linear motor and controller 16 driven from a computer 17.

A pair of stationary cooling plates 18 and 19, as of aluminum, are disposed on opposite sides of the moving slab 12. A thin static layer of a fluid-cooling medium, such as helium gas or deionized water is interposed between the cooling plates 18 and 19 and the slab 12 for cooling the slab 12 in use. In the case of helium gas medium, it is inducted into the narrow space through distributor manifolds 20 in the plates 18 and 19. The cooling plates are cooled by cooling modules 18 and 19 and through which cooling waters pass to remove heat from the plates 18 and 19.

Referring now to FIG. 4, the optical pumping lamps 14 and 15. illuminate a narrow selected region of the slab 12 with optical pumping radiation passing through thin Pyrex windows 30. The lasant optical radiation emanating from the optically pumped region of the slab is caused to be internally reflected from the broad faces of the slab and to pass out of the slab through Brewster angle faces 22 and 23 at opposite ends thereof. The lasant radiation excites an optically resonant mode of an optical resonator defined by a pair of mirrors 24 and 25 at opposite ends of the slab 12. The optical resonator has an optical axis 26 parallel to the broad faces of the slab 12 and lying generally in the mid-plane of the slab 12. Mirror 24 is concave and mirror 25 is planar. The optical beam 27 of the laser is taken out through the planar mirror 25 which is only partially reflective, i.e., 40% to 60% reflective, at the lasant and optical resonant wavelength near 1 $\mu$m.

Referring now to FIG. 2, there is shown the slab carriage 13 for holding and moving the slab 12 precisely along the desired reciprocal rectilinear path 31 generally orthogonal to the directional of the optical axis 26 of the optical resonator. The carriage 13 includes a pair of aluminum sidebars 32 and 33 disposed along opposite side edges of the slab 12. A pair of axially spaced end frames 34 and 35, as of aluminum, are disposed at opposite ends of the slab and extend over opposite major faces of the slab 12 for capturing the ends of the slab 12 between the block portions 36. The sidebars 32 and 33 are fixedly secured to the end frames 34 and 35 via screws 37.

A pair of cross roller ways 38 and 39 are disposed at opposite ends 34 and 35 of the slab carriage 13 for precisely guiding the rectilinear motion of the carriage 13 and slab 12 to be orthogonal relative to the optical axis 26 of the resonator. The cross roller ways 38 and 39 each include a pair of members 41 and 42 coupled together in side-by-side relationship and being axially slidable, one relative to the other. Each member 41 and 42 includes opposed longitudinal V-shaped grooves 43 containing roller bearings 44. The two members 41 and 42 of each pair are pressed together and include a sliding joint at 45.

One member 41 of the cross roller ways 38 and 39 is fixedly secured, as by screws, to the end frame members 34 and 35 of the carriage to define a follower while the other member 42 of the cross roller way is fixedly secured to the lower cooling plate 19 to define a track. The cross roller ways are commercially available as Model CRW-2-180 from IKO International Inc. of Torrance, California.

Referring now to FIG. 3, there is shown an alternative embodiment of the cross roller ways of FIG. 2. In this embodiment, a cylindrical rail 46, for guiding motion of the slab carrier 13, is affixed to the cooling plate 19 at opposite ends of the carriage 13, whereas a pair of axially spaced cylindrical ball-bearing bushing followers 47 ride on the rail 46 and are fixedly secured to the end frames 34 and 35 of the slab carriage 13. A continuous loop of ball-bearings 48 are interposed between the respective bushing followers 47 and the rails 46. Such a ball-bushing-bearing is commercially available as Model ICB-12-FAO-L24 from Thompson Industries, Inc. of Port Washington, N.Y.

Referring now to FIG. 5, there is shown an alternative embodiment of the present invention. In this embodiment, the moving slab laser 51 has a slab 12 of lasant material separated into a pair of geometrically identical slab portions 52 and 53, each in its separate slab carriage 13, as aforedescribed. The slab portions 52 and 53 are moved along rectilinear reciprocal paths in opposite directions, i.e., into the paper and out of the paper, as shown by (+) and (.) in FIG. 5. In this manner, temperature gradient beam steering effects which are dependent on the direction of movement of the slab relative to the optically pumped region of the slab, cancel each other because the movement is in opposite directions in the two slab portions.

In a typical physical realization of the moving slab laser system 11 of the present invention, the slab 12 is a 3.3% doped LHG-5 glass of dimensions 16.7 cm by 15 cm by 0.44 cm. The slab 12 is pumped with cw lamp-pumping power of 7.3 kW of average power. Two 15-cm long 4 mm diameter Krypton lamps 14 and 15 were used to pump the slab from both sides. The Pyrex windows through which the pumping radiation passes to the slab were 2 mm thick. The slab speed could be varied between 0 and 50 cm/sec. at a programmed velocity profile. In a typical example, the Nd:Glass slab 12 was moved at a speed of 5 cm/sec. over a distance of 5 cm and at an acceleration of 147 cm/sec.$^2$ at the turning points. The residence time of the slab under the lamps was 80 m sec. at the slab center and 80.2 m sec. at the slab ends. The laser resonator consisted of a three meter radius high reflectance mirror 24 and a 40% reflectance flat output coupling mirror 25. The laser oscillated in multi-transverse modes with the lasant beam at the output mirror 25 being 4 mm by 7 mm in size at the highest power level. The output beam divergence for this geometry was 0.98 m rad. The superimposed beam spot size at 2.26 m from the output mirror 25 was 3.5 mm in diameter, compared with the individual spots, which were 3 mm in diameter. This amounts to less then 0.24 mrad. of steering for the $TEM_{00}$ mode.

The advantages of the present invention include the provision of a moving slab laser in which unwanted beam steering effects are minimized. Such a moving slab laser is capable of generating high peak power pulses at high repetition rates and is an ideal source for x-ray lithography and microscopy and for pumping short-wavelength lasers.

What is claimed is:

1. In a solid state laser of the type characterized by slab shaped means of solid lasant material having a pair of opposed major faces between which optical lasant nergy generated within said slab means is caused to be internally reflected in a zig-zag path and out of said slab means as an output beam, the improvement comprising:

optical pumping means for passing optical pumping radiation through a selected region of at least one of said major faces and into said slab means for optically pumping said lasant material;

moving means for imparting cyclical relative motion between said slab means of lasant material and a selected region of said slab means which is illuminated by said optical pumping radiation so as to distribute the heat generated in said slab means of lasant material via said optical pumping radiation approximately evenly throughout said slab means of lasant material, whereby thermally induced depolarization and focusing effects are reduced;

cooling means disposed proximate said slab means of lasant material for conducting heat away therefrom;

said cooling means including a cooling plate of thermally conductive material positioned facing and proximate at least one of said major faces of said slab means of lasant material;

a coupling layer of fluid medium interposed between a major face of said lasant slab means and said proximate plate of thermally conductive material for providing thermal conduction therebetween;

said moving means including a slab carriage means for holding and moving said slab means of lasant material relative to said selected region of said slab means which is illuminated by said optical pumping radiation; and guide means for defining a precise rectilinear reciprocal path of movement of said slab means of lasant material.

2. The laser of claim 1 wherein said guide means includes track means fixedly secured to said cooling plate and defining a precise rectilinear path; and follower means fixedly secured to said movable carriage means and riding in mechanical engagement with said track means for precisely guiding rectilinear reciprocal movement of said carriage means and said slab means of lasant material.

3. The laser of claim 2 wherein said follower means includes rollers rolling in engagement with said track means.

4. The laser of claim 2 wherein said track means includes rectilinear rail structure, and said follower means includes bushings containing roller bearings interposed between said bushings and said rail structure.

5. The laser of claim 1 including a linear motor mechanically coupled to said slab carriage means for driving said carriage means to-and-fro along said precise rectilinear reciprocal path guided by said guide means.

6. The laser of claim 1 wherein said slab means of lasant material includes a pair of slab members of solid lasant material; and wherein said moving means includes means for moving said pair of slab members simultaneously in opposite directions along parallel rectilinear reciprocal paths, whereby unwanted thermally induced beam steering effects in each of said slab members tends to cancel each other to inhibit steering of the output beam.

* * * * *